(12) United States Patent
Ho et al.

(10) Patent No.: US 12,316,362 B2
(45) Date of Patent: May 27, 2025

(54) SIGNAL RECEIVER AND SLICER

(71) Applicant: REALTEK SEMICONDUCTOR CORPORATION, Hsinchu (TW)

(72) Inventors: Hsuan-Ting Ho, Hsinchu (TW); Shih-Hsiung Huang, Hsinchu (TW); Liang-Wei Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 386 days.

(21) Appl. No.: 17/952,584

(22) Filed: Sep. 26, 2022

(65) Prior Publication Data
US 2023/0105538 A1 Apr. 6, 2023

(30) Foreign Application Priority Data
Oct. 4, 2021 (TW) .................................. 110136938

(51) Int. Cl.
*H04B 1/12* (2006.01)
(52) U.S. Cl.
CPC .................................... *H04B 1/123* (2013.01)
(58) Field of Classification Search
CPC ....................................................... H04B 1/123
(Continued)

(56) References Cited

U.S. PATENT DOCUMENTS 5,483,289 A * 1/1996 Urade .................. H04N 7/0355
375/317
8,983,091 B2 * 3/2015 Chu ........................ H04B 15/00
381/94.2
(Continued)

FOREIGN PATENT DOCUMENTS

JP 2014220647 A 11/2014

OTHER PUBLICATIONS

1) OA letter of a counterpart TW application (appl. no. 110136938) mailed on Jul. 12, 2022. 2) Summary of the TW OA letter in regard to the TW counterpart application: (1) Claims 1 and 6 are rejected as being unpatentable over the cited reference 1 (US 2009/0269081 A1) in view of the cited reference 2 (US 2021/0167858 A1). (2) Claims 2 and 7 are rejected as being unpatentable over the cited reference 1 in view of the cited reference 2, and further in view of the cited reference (U.S. Pat. No. 5,483,289). (3) Claims 3-5 and 8-10 are allowable.

(Continued)

*Primary Examiner* — April G Gonzales
(74) *Attorney, Agent, or Firm* — WPAT, PC

(57) ABSTRACT

A signal receiver and a slicer are capable of mitigating the static mismatch error of a far-end digital-to-analog converter. The slicer includes an adjustable slicing circuit and an error signal generating circuit. The adjustable slicing circuit determines which of (N+1) signal levels is corresponding to an input signal according to N slicer levels and thereby outputs an output signal, wherein the input signal is originated from the far-end digital-to-analog converter. The adjustable slicing circuit further adjusts at least some of the (N+1) signal levels according to an error signal and adjusts at least some of the N slicer levels, wherein the N is an integer greater than two. The error signal generating circuit is coupled to the adjustable slicing circuit and generates the error signal according to the input and output signals.

20 Claims, 2 Drawing Sheets

(58) Field of Classification Search
USPC .................................................... 455/150.1
See application file for complete search history.

(56) References Cited

U.S. PATENT DOCUMENTS

| | | | | |
|---|---|---|---|---|
| 9,699,009 | B1* | 7/2017 | Ainspan | .................. H04L 25/49 |
| 9,906,232 | B1* | 2/2018 | Cho | ...................... H03M 1/007 |
| 11,637,985 | B2* | 4/2023 | Gaxiola-Sosa | .......... H04N 5/50 |
| | | | | 455/150.1 |
| 2005/0152262 | A1* | 7/2005 | Huang | ..................... H04B 3/23 |
| | | | | 370/201 |
| 2005/0185603 | A1* | 8/2005 | Huang | .................. H04B 3/142 |
| | | | | 370/286 |
| 2009/0269081 | A1* | 10/2009 | Cai | ....................... H04L 1/0045 |
| | | | | 398/202 |
| 2012/0170735 | A1* | 7/2012 | Huang | .................. H04B 3/238 |
| | | | | 379/406.1 |
| 2014/0241405 | A1* | 8/2014 | Li | .......................... H04B 3/20 |
| | | | | 375/219 |
| 2021/0167858 | A1* | 6/2021 | Gopalakrishnan | ...... H04L 25/00 |

OTHER PUBLICATIONS

Ho et al. "U.S. Appl. No. 17/728,178, Digital-to-analog conversion apparatus and method having signal calibration mechanism", filed Apr. 25, 2022, USPTO.

OA letter of a counterpart CN application (appl. no. 202111203386.2) mailed on Jan. 26, 2025.

* cited by examiner

SIGNAL RECEIVER AND SLICER

BACKGROUND OF THE INVENTION

1. Field of the Invention

The present disclosure is related to a signal receiver and a slicer, especially to a signal receiver and a slicer capable of mitigating the static mismatch error of a far-end digital-to-analog converter.

2. Description of Related Art

The variation in a process, voltage, and temperature (PVT) will cause a mismatch problem with respect to the scale and the pulse shape of the output of a digital-to-analog converter (DAC) (e.g., current DAC). A mismatch appears on the scale is called a static mismatch error and a mismatch appears on the pulse shape is called a dynamic mismatch error, wherein the static mismatch error will seriously affect the performance of a circuit system. It is noted that when the above-mentioned DAC is a far-end DAC, the circuit system receiving signals originated from the far-end DAC acts as a local system.

SUMMARY OF THE INVENTION

An object of the present disclosure is to provide a signal receiver and a slicer capable of mitigating the static mismatch error of a far-end digital-to-analog converter (far-end DAC).

An embodiment of the signal receiver of the present disclosure includes an analog-front-end (APE) circuit, an analog-to-digital converter (ADC), an equalizer circuit, an adjustable slicing circuit, and an error signal generating circuit. The AFE circuit is configured to generate an analog signal according to a received signal originated from a far-end DAC. The ADC is configured to generate a digital signal according to the analog signal. The equalizer circuit is configured to generate an input signal according to the digital signal. The adjustable slicing circuit is configured to determine which level of (N+1) signal levels is corresponding to the input signal according to N slicer levels and thereby generate an output signal, wherein the N is an integer greater than two. The adjustable slicing circuit is further configured to adjust at least a part of the (N+1) signal levels according to an error signal and adjust at least a part of the N slicer levels so as to mitigate the static mismatch error of the far-end DAC. The error signal generating circuit is coupled to the adjustable slicing circuit and configured to generate the error signal according to the input signal and output signal.

An embodiment of the slicer of the present disclosure includes an adjustable slicing circuit and an error signal generating circuit. The adjustable slicing circuit is configured to determine which level of (N+1) signal levels is corresponding to an input signal according to N slicer levels and thereby generate an output signal, wherein the input signal is originated from a far-end DAC and the N is an integer greater than two. The adjustable slicing circuit is further configured to adjust at least a part of the (N+1) signal levels according to an error signal and adjust at least a part of the N slicer levels so as to mitigate the static mismatch error of the far-end DAC. The error signal generating circuit is coupled to the adjustable slicing circuit and configured to generate the error signal according to the input signal and output signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a signal receiver and a slicer capable of mitigating the static mismatch error of a far-end digital-to-analog converter (far-end DAC). The static mismatch error is referred to: the level of an output signal of the far-end DAC being equal to a predetermined signal level plus an unwanted offset due to the variation in a process, voltage, or temperature, which may bring a signal receiver difficulty in determining the level of the output signal accurately.

Figure 1:
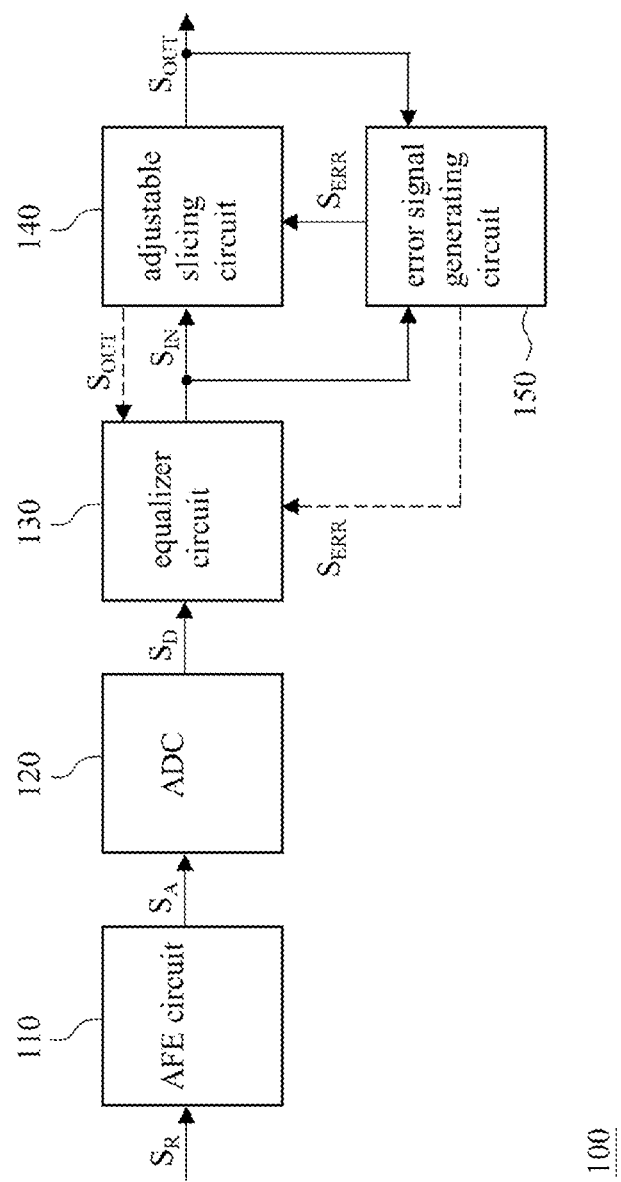
FIG. 1 shows an embodiment of the signal receiver of the present disclosure.

FIG. 1 shows an embodiment of the signal receiver of the present disclosure. The signal receiver 100 of FIG. 1 is a wired signal receiver (e.g., Gigabit Ethernet device) including an analog-front-end (AFE) circuit 110, an analog-to-digital converter (ADC) 120, an equalizer circuit 130, an adjustable slicing circuit 140, and an error signal generating circuit 150. The details of the embodiment of FIG. 1 are described in the following paragraphs.

In regard to the embodiment of FIG. 1, the AFE circuit 110 is configured to generate an analog signal $S_A$ according to a received signal $S_R$, wherein the received signal $S_R$ is originated from the aforementioned far-end DAC and transmitted to the signal receiver 100 via a wired transmission channel. The AFE circuit 110 alone is a known/self-developed circuit, and its detail falls beyond the scope of the present disclosure.

In regard to the embodiment of FIG. 1, the ADC 120 is configured to generate a digital signal $S_D$ according to the analog signal $S_A$. The ADC 120 alone is a known/self-developed circuit, and its detail falls beyond the scope of the present disclosure.

Figure 2:
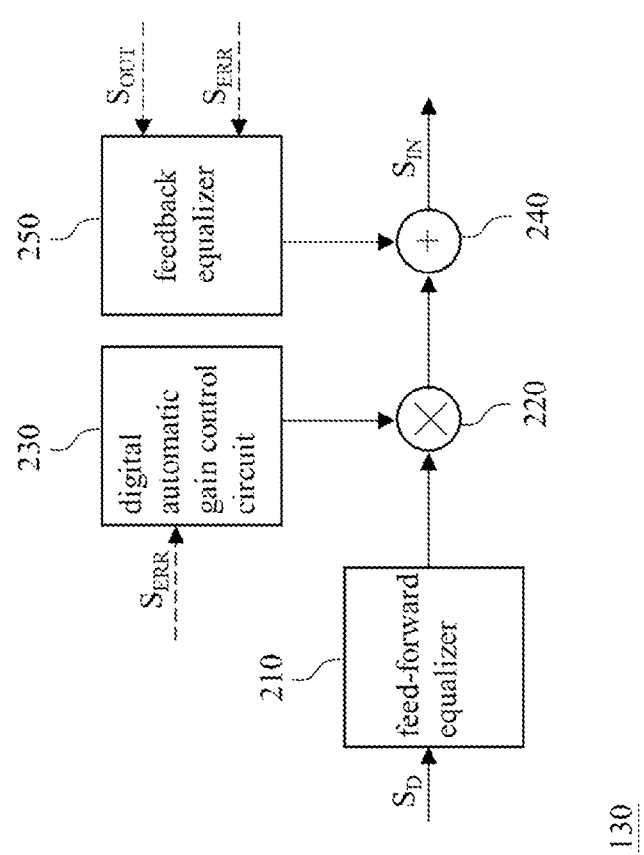
FIG. 2 shows an embodiment of the equalizer circuit of FIG. 1.

In regard to the embodiment of FIG. 1, the equalizer circuit 130 is configured to generate an input signal $S_{IN}$ according to the digital signal $S_D$. The equalizer circuit 130 can optionally be configured to generate the input signal $S_{IN}$ according to a feedback signal from the adjustable slicing circuit 140 (i.e., the output signal $S_{OUT}$ from the adjustable slicing circuit 140 to the equalizer circuit 130) and an error signal $S_{ERR}$ from the error signal generating circuit 150 (i.e., the error signal $S_{ERR}$ from the error signal generating circuit 150 to the equalizer circuit 130) as shown in FIG. 1. The equalizer circuit 130 alone is a known/self-developed circuit; for example, as shown in FIG. 2, the equalizer circuit 130 includes a feed-forward equalizer (FFE) 210, a multiplier 220, a digital automatic gain control (DACG) circuit 230, an adder 240, and a feedback equalizer (FBE) 250. Each circuit in FIG. 2 alone is a known/self-developed circuit, and its detail falls beyond the scope of the present disclosure. It is noted that the setting and adjustment of parameters of the equalizer circuit 130 can be determined according to the demand for implementation, and this falls beyond the scope of the present disclosure.

In regard to the embodiment of FIG. 1, the adjustable slicing circuit 140 is configured to determine which level of (N+1) signal levels is corresponding to the input signal $S_{IN}$ according to N slicer levels and thereby generate an output signal $S_{OUT}$ having the determined level, wherein the N slicer levels are in incremental order (i.e., $1^{st}$ slicer level, $2^{nd}$ slicer level, . . . , $N^{th}$ slicer level), the (N+1) signal levels are in incremental order (i.e., $1^{st}$ signal level, $2^{nd}$ signal level, . . . , $(N+1)^{th}$ signal level), and the N is an integer greater than two. For example, when the level of the input signal $S_{IN}$ is higher than the $N^{th}$ slicer level (i.e., the maximum slicer level of the N slicer levels), the adjustable slicing circuit 140 determines that the input signal $S_{IN}$ is corresponding to the $(N+1)^{th}$ signal level (i.e., the maximum signal level of the (N+1) signal levels) and then generates the output signal $S_{OUT}$ having the $(N+1)^{th}$ signal level; when the level of the input signal $S_{IN}$ is lower than the $1^{st}$ slicer level (i.e., the minimum slicer level of the N slicer levels), the adjustable slicing circuit 140 determines that the input signal $S_{IN}$ is corresponding to the $1^{st}$ signal level (i.e., the minimum signal level of the (N+1) signal levels) and then generates the output signal $S_{OUT}$ having the $1^{st}$ signal level; and when the level of the input signal $S_{IN}$ is higher than a certain slicer level (hereinafter referred to as "the $X^{th}$ slicer level") of the N slicer levels, the adjustable slicing circuit 140 determines that the input signal $S_{IN}$ is corresponding to the $(X+1)^{th}$ signal level of the (N+1) signal levels and then generates the output signal $S_{OUT}$ having the $(X+1)^{th}$ signal level, wherein the X is a positive integer not greater than N.

In regard to the embodiment of FIG. 1, the adjustable slicing circuit 140 is further configured to adjust at least a part of the (N+1) signal levels according to the error signal $S_{ERR}$ and adjust at least a part of the N slicer levels so as to mitigate the static mismatch error of the aforementioned far-end DAC, wherein the error signal $S_{ERR}$ is generated by the error signal generating circuit 150 according to the input signal $S_{IN}$ and the output signal $S_{OUT}$. For example, the error signal $S_{ERR}$ is equal to the difference between the input signal $S_{IN}$ and the output signal $S_{OUT}$ (i.e., $S_{ERR}=S_{IN}-S_{OUT}$).

On the basis of the above description, when the level of the output signal $S_{OUT}$ is a $K^{th}$ signal level of the (N+1) signal levels, the adjustable slicing circuit 140 adjusts the $K^{th}$ signal level according to the error signal $S_{ERR}$ and then adjusts at least one target slicer level of the N slicer levels neighboring the $K^{th}$ signal level according to a $K^{th}$ cumulative adjustment amount of the $K^{th}$ signal level, wherein the K is a positive integer between 1 and (N+1).

In an exemplary embodiment, as the error signal $S_{ERR}$ changes, the $K^{th}$ cumulative adjustment amount ($\text{Train}(K^{th})$) is adjusted to be equal to the current $K^{th}$ cumulative adjustment amount plus a coefficient (e.g., $2^{-10}$) multiplied by the error signal $S_{ERR}$, which can be expressed as follows:

$$\text{Train}(K^{th})=\text{Train}(K^{th})+\text{Mu}\times S_{ERR} \qquad (\text{eq. 1})$$

The above equation shows that the $K^{th}$ cumulative adjustment amount is increased by $\text{Mu}\times S_{ERR}$. An initial value of the $K^{th}$ cumulative adjustment amount can be zero or determined according to the demand for implementation. The coefficient can be determined according to the demand for implementation.

In the aforementioned exemplary embodiment, when the level of the output signal $S_{OUT}$ is the $K^{th}$ signal level, the adjustable slicing circuit 140 can add up the initial value of the $K^{th}$ signal level (i.e., $\text{Lvl}(K^{th})_{INI}$) and the $K^{th}$ cumulative adjustment amount (i.e., $\text{Train}(K^{th})$ on the left side of the equal sign of eq. 1) to obtain the adjusted $K^{th}$ signal level (i.e., $\text{Lvl}(K^{th})$), which can be expressed as follows:

$$\text{Lvl}(K^{th})=\text{Lvl}(K^{th})_{INI}+\text{Train}(K^{th}) \qquad (\text{eq. 2})$$

In the aforementioned exemplary embodiment, if the K is less than (N+1), after adjusting the $K^{th}$ signal level, the adjustable slicing circuit 140 adjusts an upper target slicer level of the N slicer levels between the $K^{th}$ signal level and a $(K+1)^{th}$ signal level of the (N+1) signal levels according to the $K^{th}$ signal level and the $(K+1)^{th}$ signal level. For example, the adjustable slicing circuit 140 adds up an initial value of the upper target slicer level $$\left(\text{i.e., SlicerLvl}\left(\frac{K+(K+1)^{th}}{2}\right)_{INI}\right),$$

and an average of the $K^{th}$ cumulative adjustment amount (i.e., the latest $\text{Train}(K^{th})$) and a $(K+1)^{th}$ cumulative adjustment amount (i.e., the latest $\text{Train}((K+1)^{th})$) of the $(K+1)^{th}$ signal level to obtain the adjusted upper target slicer level $$\left(\text{i.e., SlicerLvl}\left(\frac{K+(K+1)^{th}}{2}\right)\right),$$

which can be expressed as follows:

$$\text{SlicerLvl}\left(\frac{K+(K+1)^{th}}{2}\right)= \qquad (\text{eq. 3})$$
$$\text{SlicerLvl}\left(\frac{K+(K+1)^{th}}{2}\right)_{INI}+\frac{\text{Train}(K^{th})+\text{Train}((K+1)^{th})}{2}$$

In the aforementioned exemplary embodiment, if the K is greater than one, after adjusting the $K^{th}$ signal level, the adjustable slicing circuit 140 adjusts a lower target slicer level of the N slicer levels between the $K^{th}$ signal level and a $(K-1)^{th}$ signal level of the (N+1) signal levels according to the $K^{th}$ signal level and the $(K-1)^{th}$ signal level. For example, the adjustable slicing circuit 140 adds up an initial value of the upper target slicer level $$\left(\text{i.e., SlicerLvl}\left(\frac{K+(K-1)^{th}}{2}\right)_{INI}\right)$$

and an average of the $K^{th}$ cumulative adjustment amount (i.e., the latest $\text{Train}(K^{th})$) and a $(K-1)^{th}$ cumulative adjustment amount (i.e., the latest $\text{Train}((K-1)^{th})$) of the $(K-1)^{th}$ signal level to obtain the adjusted lower target slicer level $$\left(\text{i.e., SlicerLvl}\left(\frac{K+(K-1)^{th}}{2}\right)\right),$$

which can be expressed as follows:

$$\text{SlicerLvl}\left(\frac{K+(K-1)^{th}}{2}\right)= \qquad (\text{eq. 4})$$
$$\text{SlicerLvl}\left(\frac{K+(K-1)^{th}}{2}\right)_{INI}+\frac{\text{Train}(K^{th})+\text{Train}((K-1)^{th})}{2}$$

It is noted that if the equalizer circuit 130 generates the input signal $S_{IN}$ according to the digital signal $S_D$ and the feedback signal (i.e., the output signal $S_{OUT}$) of the adjustable slicing circuit 140, the input signal $S_{IN}$ and the output signal Sour may interact with each other and change interdependently, which may lead to the overflow of hardware. In order to prevent the overflow of hardware, the adjustable slicing circuit 140 can optionally make at least two signal levels of the (N+1) signal levels remain unchanged and thereby make an anchoring effect. For example, the at least two signal levels are a $(N+1)^{th}$ signal level and a first signal level of the (N+1) signal levels; in other words, the at least two signal levels are the maximum and minimum signal levels of the (N+1) signal levels. For example, the at least two signal levels are any other two signal levels of the (N+1) signal levels (e.g., the second maximum signal level and the second minimum signal level of the (N+1) signal levels), if practicable.

In an exemplary embodiment, the (N+1) signal levels are sixteen signal levels (i.e., $Lvl(K^{th})$:: $Lvl(16^{th})$, $Lvl(15^{th})$, ..., $Lvl(2^{nd})$, and $Lvl(1^{st})$), and their initial values (i.e., $Lvl(K^{th})_{INI}$: $Lvl(16^{th})_{INI}$, $Lvl(15^{th})_{INI}$, ..., $Lvl(2^{st})_{INI}$, and $Lvl(1^{st})_{INI}$) are in decremental order as follows: 15, 13, 11, 9, 7, 5, 3, 1, −1, −3, −5, −7, −9, −11, −13, and −15; the N slicer levels are fifteen slicer levels $$\left(\text{i.e., SlicerLvl}\left(\frac{K+(K\pm 1)^{th}}{2}\right)\right):$$

SlicerLvl($15.5^{th}$), SlicerLvl($14.5^{th}$), ..., SlicerLvl($2.5^{th}$), and SlicerLvl($1.5^{th}$)), and their initial values $$\left(\text{i.e., SlicerLvl}\left(\frac{K+(K\pm 1)^{th}}{2}\right)_{INI}\right):$$

SlicerLvl($15.5^{th}$)$_{INI}$, SlicerLvl($14.5^{th}$)$_{INI}$, ..., SlicerLvl($2.5^{th}$)$_{INI}$, and SlicerLvl($1.5^{th}$)$_{INI}$ are in decremental order as follows: 14, 12, 10, 8, 6, 4, 2, 0, −2, −4, −6, −8, −10, −12, −14. Each signal level/slicer level here is a numerical value, and its physical meaning (e.g., signal strength) can be defined according to the demand for implementation. Table 1 shows the adjusted sixteen signal levels and the adjusted fifteen slicer levels, wherein the maximum signal level (i.e., Lvl($16^{th}$)=15) and the minimum signal level (i.e., Lvl($1^{st}$)=−15) remain constant to function as anchors. In Table 1, when Train(M) represents the aforementioned Train($K^{th}$), Train(M+2) and Train(M−2) represent the aforementioned Train($(K+1)^{th}$) and Train($(K−1)^{th}$) respectively, wherein M is an odd integer between 15 and −15.

TABLE 1

| signal level (Lvl($K^{th}$)) after adjustment | slicer level $\left(\text{SlicerLvl}\left(\frac{K+(K\pm 1)^{th}}{2}\right)\right)$ after adjustment |
|---|---|
| Lvl($16^{th}$) = 15 + Train(15) Train(15) = 0 | |
| | SlicerLvl($15.5^{th}$) = 14 + $\frac{\text{Train}(15)+\text{Train}(13)}{2}$ |
| Lvl($15^{th}$) = 13 + Train(13) | |
| | SlicerLvl($14.5^{th}$) = 12 + $\frac{\text{Train}(13)+\text{Train}(11)}{2}$ |
| Lvl($14^{th}$) = 11 + Train(11) | |
| | SlicerLvl($13.5^{th}$) = 10 + $\frac{\text{Train}(11)+\text{Train}(9)}{2}$ |
| Lvl($13^{th}$) = 9 + Train(9) | |
| | SlicerLvl($12.5^{th}$) = 8 + $\frac{\text{Train}(9)+\text{Train}(7)}{2}$ |
| Lvl($12^{th}$) = 7 + Train(7) | |
| | SlicerLvl($11.5^{th}$) = 6 + $\frac{\text{Train}(7)+\text{Train}(5)}{2}$ |
| Lvl($11^{th}$) = 5 + Train(5) | |
| | SlicerLvl($10.5^{th}$) = 4 + $\frac{\text{Train}(5)+\text{Train}(3)}{2}$ |
| Lvl($10^{th}$) = 3 + Train(3) | |
| | SlicerLvl($9.5^{th}$) = 2 + $\frac{\text{Train}(3)+\text{Train}(1)}{2}$ |

TABLE 1-continued

| signal level (Lvl($K^{th}$)) after adjustment | slicer level $\left(SlicerLvl\left(\frac{K+(K\pm1)^{th}}{2}\right)\right)$ after adjustment |
|---|---|
| Lvl($9^{th}$) = 1 + Train(1) | |
| | $SlicerLvl(8.5^{th}) = 0 + \frac{Train(1) + Train(-1)}{2}$ |
| Lvl($8^{th}$) = −1 + Train(−1) | |
| | $SlicerLvl(7.5^{th}) = -2 + \frac{Train(-1) + Train(-3)}{2}$ |
| Lvl($7^{th}$) = −3 + Train(−3) | |
| | $SlicerLvl(6.5^{th}) = -4 + \frac{Train(-3) + Train(-5)}{2}$ |
| Lvl($6^{th}$) = −5 + Train(−5) | |
| | $SlicerLvl(5.5^{th}) = -6 + \frac{Train(-5) + Train(-7)}{2}$ |
| Lvl($5^{th}$) = −7 + Train(−7) | |
| | $SlicerLvl(4.5^{th}) = -8 + \frac{Train(-7) + Train(-9)}{2}$ |
| Lvl($4^{th}$) = −9 + Train(−9) | |
| | $SlicerLvl(3.5^{th}) = -10 + \frac{Train(-9) + Train(-11)}{2}$ |
| Lvl($3^{rd}$) = −11 + Train(−11) | |
| | $SlicerLvl(2.5^{th}) = -12 + \frac{Train(-11) + Train(-13)}{2}$ |
| Lvl($2^{nd}$) = −13 + Train(−13) | |
| | $SlicerLvl(1.5^{th}) = -14 + \frac{Train(-13) + Train(-15)}{2}$ |
| Lvl($1^{st}$) = −15 + Train(−15) Train(−15) = 0 | |

It is noted that the adjustable slicing circuit 140 and the error signal generating circuit 150 of FIG. 1 can jointly function as a slicer which can be implemented independently. The slicer can be applied to any known/self-developed signal receiver as long as such applications are practicable.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the signal receiver and the slicer of the present disclosure can mitigate the static mismatch error of a far-end DAC.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A signal receiver capable of mitigating a static mismatch error of a far-end digital-to-analog converter (far-end DAC), the signal receiver comprising:
    an analog-front-end (AFE) circuit configured to generate an analog signal according to a received signal originated from the far-end DAC;
    an analog-to-digital converter (ADC) configured to generate a digital signal according to the analog signal;
    an equalizer circuit configured to generate an input signal according to the digital signal;
    an adjustable slicing circuit configured to determine which level of (N+1) signal levels is corresponding to the input signal according to N slicer levels and thereby generate an output signal, and the adjustable slicing circuit further configured to adjust at least a part of the (N+1) signal levels according to an error signal and adjust at least a part of the N slicer levels, wherein the N is an integer greater than two; and
    an error signal generating circuit coupled to the adjustable slicing circuit and configured to generate the error signal according to the input signal and output signal.

2. The signal receiver of claim 1, wherein the error signal is equal to a difference between the input signal and the output signal.

3. The signal receiver of claim 1, wherein the adjustable slicing circuit leaves at least two signal levels of the (N+1) signal levels unchanged.

4. The signal receiver of claim 3, wherein the at least two signal levels are an $(N+1)^{th}$ signal level and a first signal level respectively; the $(N+1)^{th}$ signal level is a maximum signal level of the (N+1) signal levels; and the first signal level is a minimum signal level of the (N+1) signal levels.

5. The signal receiver of claim 1, wherein when a level of the output signal is a $K^{th}$ signal level of the (N+1) signal levels, the adjustable slicing circuit adjusts the $K^{th}$ signal level according to the error signal and then adjusts at least one target slicer level of the N slicer levels neighboring the $K^{th}$ signal level according to a $K^{th}$ cumulative adjustment amount of the $K^{th}$ signal level; and the K is a positive integer between 1 and (N+1).

6. The signal receiver of claim 5, wherein the $K^{th}$ cumulative adjustment amount is equal to a current value of the $K^{th}$ cumulative adjustment amount plus a coefficient multiplied by the error signal.

7. The signal receiver of claim 5, wherein when the level of the output signal is the $K^{th}$ signal level and the K is less than (N+1), the adjustable slicing circuit adjusts the $K^{th}$ signal level according to the error signal first, and then adjusts an upper target slicer level of the N slicer levels between the $K^{th}$ signal level and a $(K+1)^{th}$ signal level of the (N+1) signal levels according to the $K^{th}$ signal level and the $(K+1)^{th}$ signal level.

8. The signal receiver of claim 7, wherein the adjustable slicing circuit adjusts the upper target slicer level through following calculation: adding up an initial value of the upper target slicer level and an average of the $K^{th}$ cumulative adjustment amount and a $(K+1)^{th}$ cumulative adjustment amount of the $(K+1)^{th}$ signal level.

9. The signal receiver of claim 5, wherein when the level of the output signal is the $K^{th}$ signal level and the K is greater than one, the adjustable slicing circuit adjusts the $K^{th}$ signal level according to the error signal first, and then adjusts a lower target slicer level of the N slicer levels between the $K^{th}$ signal level and a $(K-1)^{th}$ signal level of the (N+1) signal levels according to the $K^{th}$ signal level and the $(K-1)^{th}$ signal level.

10. The signal receiver of claim 9, wherein the adjustable slicing circuit adjusts the lower target slicer level through following calculation: adding up an initial value of the lower target slicer level and an average of the $K^{th}$ cumulative adjustment amount and a $(K+1)^{th}$ cumulative adjustment amount of the $(K+1)^{th}$ signal level.

11. A slicer capable of mitigating a static mismatch error of a far-end digital-to-analog converter (far-end DAC), the slicer comprising:
an adjustable slicing circuit configured to determine which level of (N+1) signal levels is corresponding to an input signal according to N slicer levels and thereby generate an output signal, and the adjustable slicing circuit further configured to adjust at least a part of the (N+1) signal levels according to an error signal and adjust at least a part of the N slicer levels, wherein the input signal is originated from the far-end DAC and the N is an integer greater than two; and
an error signal generating circuit coupled to the adjustable slicing circuit and configured to generate the error signal according to the input signal and output signal.

12. The slicer of claim 11, wherein the error signal is equal to a difference between the input signal and the output signal.

13. The slicer of claim 11, wherein the adjustable slicing circuit leaves an $(N+1)^{th}$ signal level and a first signal level of the (N+1) signal levels unchanged, the $(N+1)^{th}$ signal level is a maximum signal level of the (N+1) signal levels; and the first signal level is a minimum signal level of the (N+1) signal levels.

14. The slicer of claim 11, wherein when a level of the output signal is a $K^{th}$ signal level of the (N+1) signal levels, the adjustable slicing circuit adjusts the $K^{th}$ signal level according to the error signal and then adjusts at least one target slicer level of the N slicer levels neighboring the $K^{th}$ signal level according to a $K^{th}$ cumulative adjustment amount of the $K^{th}$ signal level;
and the K is a positive integer between 1 and (N+1).

15. The slicer of claim 14, wherein the $K^{th}$ cumulative adjustment amount is equal to a current value of the $K^{th}$ cumulative adjustment amount plus a coefficient multiplied by the error signal.

16. The slicer of claim 14, wherein when the level of the output signal is the $K^{th}$ signal level, the K is less than (N+1), and the K is greater than one, the adjustable slicing circuit adjusts the $K^{th}$ signal level according to the error signal, and then adjusts two target slicer levels of the N slicer levels neighboring the $K^{th}$ signal level according to the $K^{th}$ cumulative adjustment amount.

17. The slicer of claim 14, wherein when the level of the output signal is the $K^{th}$ signal level and the K is less than (N+1), the adjustable slicing circuit adjusts the $K^{th}$ signal level according to the error signal first, and then adjusts an upper target slicer level of the N slicer levels between the $K^{th}$ signal level and a $(K+1)^{th}$ signal level of the (N+1) signal levels according to the $K^{th}$ signal level and the $(K+1)^{th}$ signal level.

18. The slicer of claim 17, wherein the adjustable slicing circuit adjusts the upper target slicer level through following calculation: adding up an initial value of the upper target slicer level and an average of the $K^{th}$ cumulative adjustment amount and a $(K+1)^{th}$ cumulative adjustment amount of the $(K+1)^{th}$ signal level.

19. The slicer of claim 14, wherein when the level of the output signal is the $K^{th}$ signal level and the K is greater than one, the adjustable slicing circuit adjusts the $K^{th}$ signal level according to the error signal first, and then adjusts a lower target slicer level of the N slicer levels between the $K^{th}$ signal level and a $(K-1)^{th}$ signal level of the (N+1) signal levels according to the $K^{th}$ signal level and the $(K-1)^{th}$ signal level.

20. The slicer of claim 19, wherein the adjustable slicing circuit adjusts the lower target slicer level through following calculation: adding up an initial value of the lower target slicer level and an average of the $K^{th}$ cumulative adjustment amount and a $(K+1)^{th}$ cumulative adjustment amount of the $(K+1)^{th}$ signal level.

* * * * *